United States Patent [19]
Smith

[11] 4,428,104
[45] Jan. 31, 1984

[54] GROUND CLAMP

[75] Inventor: Donald J. Smith, Woodland Hills, Calif.

[73] Assignee: Communications Technology Corporation, Los Angeles, Calif.

[21] Appl. No.: 356,426

[22] Filed: Mar. 9, 1982

[51] Int. Cl.³ ............ F16L 3/00

[52] U.S. Cl. ............ 24/279; 24/20 LS; 174/47; 248/68 R; 248/74 B

[58] Field of Search ............ 24/20 LS, 68 PP, 129 R, 24/129 B, 279, 282, 284, 243 B; 174/40 CC, 47; 40/316; 339/13, 15; 403/188; 248/74.1, 74.3, 74.4, 74.5, 74.7, 74.8, 68 R

[56] References Cited

U.S. PATENT DOCUMENTS

| | | | |
|---|---|---|---|
| 972,489 | 10/1910 | Adams | 24/20 LS |
| 1,861,130 | 4/1932 | Mitchel | 248/74.3 |
| 2,650,948 | 9/1953 | Findlay | 248/68 R |
| 2,891,296 | 6/1959 | Darde | 248/74.1 |
| 3,061,254 | 10/1962 | Piasecki | 248/74.7 |
| 3,171,889 | 3/1965 | McCarthy | 174/47 |
| 3,285,552 | 11/1966 | Becker | 248/68 R |

*Primary Examiner*—Gene Mancene
*Assistant Examiner*—David L. Tarnoff
*Attorney, Agent, or Firm*—Harris, Kern, Wallen & Tinsley

[57] ABSTRACT

A ground clamp for making an electrical connection between a wire and a metal pipe. A metal saddle having a central plate, opposed down turned sides defining a pipe engaging channel, and opposed up turned ends with openings for receiving a wire, with the ends having fingers projecting toward each other defining a band space between the fingers and the plate, with a ground wire passing through the band space and the openings and with a pipe band passing through the space between the fingers and the wire, with means for drawing the ends of the band together to clamp the wire in the saddle and clamp the wire and saddle onto the pipe.

4 Claims, 4 Drawing Figures

FIG. 1
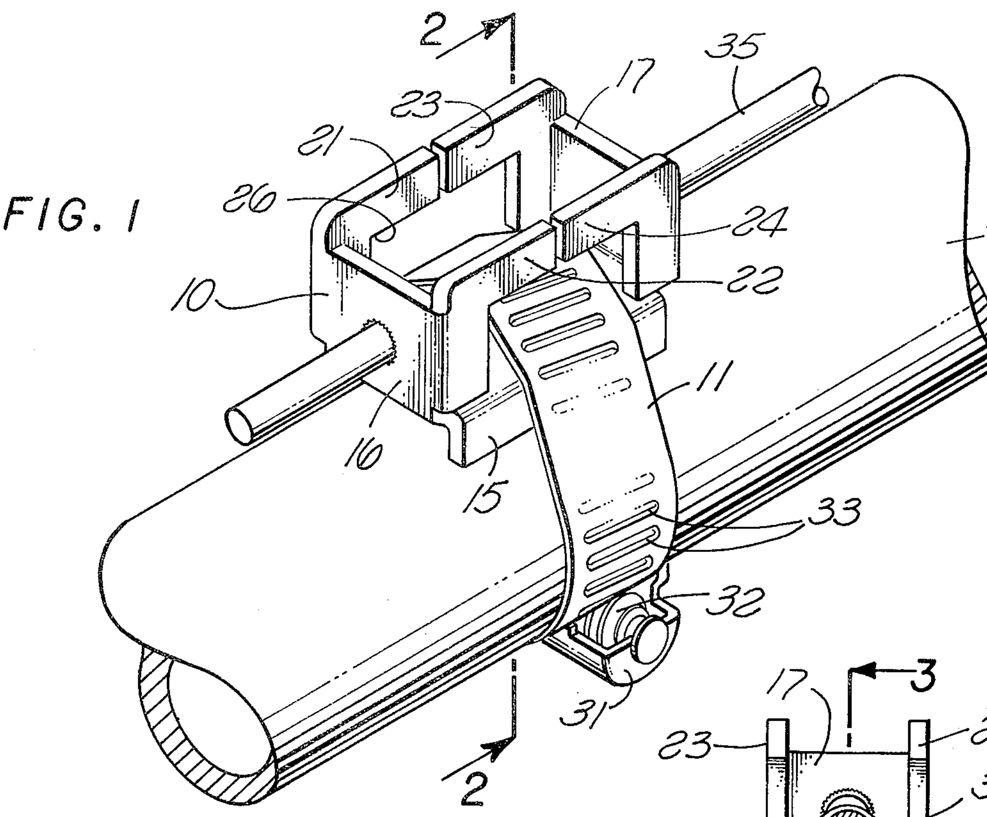
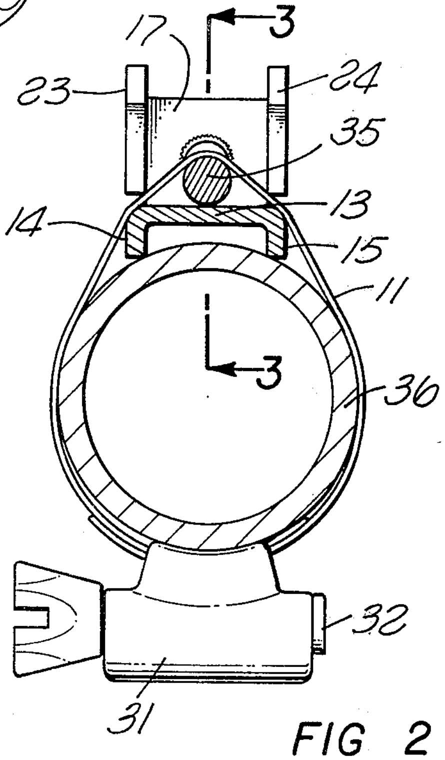
FIG 2
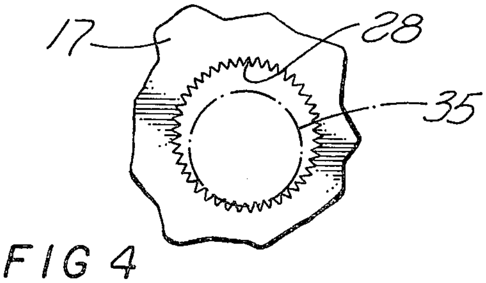
FIG 4
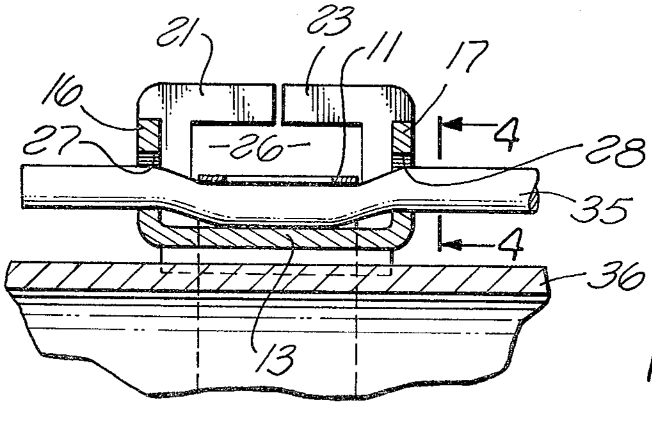
FIG 3

GROUND CLAMP

BACKGROUND OF THE INVENTION

This invention relates to ground clamps suitable for making electrical connections between a grounding conductor and an earth ground, such as a metal pipe.

A variety of devices have been utilized for making electrical ground connections between a ground wire and a ground pipe. One such device includes a perforated copper strap with a screw and first nut for clamping the strap onto a pipe, and with a second nut for clamping a wire to the strap. The perforated strap provides for attaching the unit to various diameters of pipe. The strap is limited in the size of pipe to which it can be attached, and several lengths of strap are sometimes provided.

Another prior art ground clamp consists of two cast iron saddles fastened about a pipe with screws. A ground wire terminated in a lug is attached under one of the screws. A third screw is threaded in one of the saddles and has a pointed end for making electrical contact with the pipe. This type of clamp requires many sizes of saddles to accommodate a range of pipe sizes. Also when used on copper water pipe, the third screw can and often does dent and collapse the pipe.

These prior art devices have been satisfactory in some applications. However at the present time there is need for making ground connections with larger conductors, such as a solid number 6 wire which is in the order of $\frac{1}{8}$ inch diameter. It is very difficult to make wrap around type connections with wire of this size and one solution has been to attach a lug or similar component to the ground wire and then bolt the lug to a ground strap or ground band. This type of connection requires additional parts and additional time in making the connection.

Ground wires may be of any size and either solid or stranded. At the present time, wires of size numbers 6 and 14 are widely used and typically two different sizes of ground clamps are required to accommodate them, a number 6 wire having a cross-section area more than six times that of a number 14 wire.

It is an object of the present invention to provide a new and improved ground clamp which can be used for making electrical ground connections between various sizes of ground wire and various sizes of pipe, and in particular a ground clamp which can be utilized with wire in the size range of number 6 to number 14, either solid or stranded.

It is another object of the invention to provide such a ground clamp which can utilize conventional pipe bands or hose clamps and requires only one additional component.

Other objects, advantages, features and results will more fully appear in the course of the following description.

SUMMARY OF THE INVENTION

A ground clamp for making an electrical connection between a wire and a metal pipe. A metal saddle having a central plate, opposed down turned sides defining a pipe engaging channel, and opposed up turned ends with aligned openings for receiving a wire and with the lower edges of the openings spaced upward from the plate. Preferably the saddle includes one or more fingers at the up turned ends defining a band space between the finger or fingers and the plate for receiving and retaining a pipe band. A pipe band is passed through the band space of the saddle, with the band having means for drawing the ends of the band together.

BRIEF DESCRIPTION OF THE DRAWING

FIG. 1 is a perspective view of a ground clamp with ground wire and ground pipe and incorporating the presently preferred embodiment of the invention;

FIG. 2 is a sectional view taken along the line 2—2 of FIG. 1;

FIG. 3 is a partial sectional view taken along the line 3—3 of FIG. 2; and FIG. 4 is an enlarged partial sectional view taken along the line 4—4 of FIG. 3.

DESCRIPTION OF THE PREFERRED EMBODIMENT

The ground clamp includes a metal saddle 10 and a pipe band 11. The saddle 10 typically is formed by stamping from a piece of sheet metal, with appropriate punching and bending. The saddle includes a central plate 13, with down turned sides 14, 15 and up turned ends 16, 17. The central plate 13 with the down turned sides 14, 15 form a channel, as best seen in FIG. 2.

One or more fingers are provided on the ends 16, 17, and in the embodiment illustrated, four fingers 21–24 are utilized. The fingers 21, 22 extend in spaced parallel relation from the end 16 toward the fingers 23, 24 which extend in spaced parallel relation from the end 17. The pipe band 11 passes through the band space 26 defined by the fingers and the central plate.

Generally aligned openings 27, 28 are provided in the ends 16, 17 respectively. The lower edges of these openings are spaced above the central plate 13, as best seen in FIG. 3. The openings preferably are serrated as shown in FIG. 4.

The pipe band 11 may be the band of a conventional pipe or hose clamp comprising the band, a housing 31 and a screw 32, with the band having diagonal slots 33 for engagement by the screw.

The ground clamp is suitable for use with various sizes of wire and is particularly suited for use with large wire, such as number 6, and is suitable for use with various sizes of pipe. In use, a ground wire is passed through the openings 27, 28. A pipe band 11 is passed through the space 26 between the fingers 21–24 and the wire 35. Typically one end of the band 11 is connected to the housing 31. Then the other end of the band after insertion through the band space 26 is inserted into the housing and the screw 32 is rotated to tighten the band about the wire 35, the saddle 10 and the ground pipe 36. Tightening of the band pulls the wire 35 down against the openings 27, 28, and deforms the wire 35, as seen in FIG. 3, providing both a secure mechanical and electrical connection between the wire and the pipe. The serrations of the openings 27, 28 bite into the wire 35, improving the connection. Usually the corners of the various portions of the saddle 10 will be sharp after stamping and it is preferable to not break these corners at the inner edges of the sides 14, 15, so that these corners bite into the pipe 36 as best seen in FIG. 2, also improving the connection.

I claim:

1. A ground clamp of a single unitary piece of metal for making an electrical and mechanical connection between a wire and a metal pipe with a pipe band as the sole fastener, comprising a metal saddle having a central plate, opposed down turned sides defining a pipe engaging channel having a first longitudinal axis, and opposed up turned ends with generally aligned openings for receiving a wire, with the inner edges of said down turned sides having sharp corners, and with the lower edges of said openings spaced upward from said plate, and with said openings defining a second axis substantially parallel with said first axis, with at least one of said up turned ends including at least one finger projecting toward the other of said ends defining a band space between said plate and at least one finger for receiving and retaining a pipe band so that a single pipe band positioned about a pipe and a wire with said saddle therebetween with the pipe at said pipe engaging channel and the wire in said aligned openings, urges the pipe and wire toward each other deforming the wire between said aligned openings thereby grounding said wire to said pipe.

2. A ground clamp as defined in claim 1 with each of said up turned ends having spaced parallel fingers projecting toward the corresponding fingers of the other end defining a band space between said plate and fingers for receiving and retaining a pipe band.

3. A two piece ground clamp assembly for making an electrical and mechanical connection between a wire and a metal pipe, consisting of:

a metal saddle having a central plate, opposed down turned sides defining a pipe engaging channel having a first longitudinal axis for receiving said pipe in said channel, and opposed up turned ends with generally aligned openings for receiving a wire, with the inner edges of said down turned sides having sharp corners, and with the lower edge of said openings spaced upward from said plate, and with said openings defining a second axis substantially parallel with said first axis, with at least one of said up turned ends having at least one finger projecting toward the other of said ends defining a band space between said plate and at least one finger for receiving and retaining a pipe band; and a pipe band passing through said band space and having means for drawing the ends of said band together about said pipe, said saddle and said wire thereby forming a ground by clamping the pipe, saddle and wire together wherein said wire passes through said end openings of said saddle.

4. A ground clamp as defined in claim 3 with each of said up turned ends having spaced parallel fingers projecting toward the corresponding fingers of the other end defining a band space between said plate and fingers for receiving and retaining a pipe band.

* * * * *